Patented July 25, 1950

2,516,403

UNITED STATES PATENT OFFICE 2,516,403

ARYLOXYALKANES

Earl T. McBee, La Fayette, Ind., and Robert O. Bolt, Richmond, Calif., assignors to Purdue Research Foundation, La Fayette, Ind., a corporation of Indiana No Drawing. Application September 11, 1946, Serial No. 696,372

4 Claims. (Cl. 260—612)

This invention relates to a group of novel compounds identified as fluorine-containing aryloxyalkanes. The invention is more particularly concerned with compounds of the general formula $$(Z)_n-R-O-CF_2-Y$$

wherein R is a phenyl or naphthyl residue; wherein Z is $CH_3$ or $CF_3$; $n$ is zero or an integer up to 2; wherein Y is selected from hydrogen, chlorine, fluorine, and alkyl or halogen-substituted alkyl radicals containing up to 2 carbon atoms, inclusive. These compounds are exceptionally stable and exhibit utility as liquid heat-transfer media.

The compounds may be prepared by the reaction of a suitable anhydrous alkali metal aryloxide or substituted aryloxide, such as sodium phenoxide, sodium methylphenoxide, sodium trifluoromethylphenoxide, sodium naphthoxide, et cetera, and a poly(chlorofluoro)alkane, e. g., dichlorodifluoromethane, 1,2-dichloro-1,1-difluoroethane, 1,2,2 - trichloro - 1,1 - difluoroethane, 1-chloro-1,1 - difluoropropane, 2-chloro-1,1,1,3,3,3-hexafluoropropane, et cetera, in an anhydrous non-reactive medium, preferably acetone or 2-butanone, at moderate temperatures, e. g., zero to 170 degrees centigrade. In some cases it may be necessary to employ the more reactive potassium aryloxide, and the reaction medium may be selected to allow optimum solubility of the particular aryloxide and poly(chlorofluoro)alkane concerned in the reaction. The resulting reaction product may be steam-distilled from a solution made basic with an alkali metal hydroxide, and the organic layer separated, washed, dried and rectified. Rectification yields the fluorine-containing aryloxyalkane or substituted aryloxyalkane containing fluorine on at least one alkane carbon atom, depending on the starting materials employed. Aryloxyalkenes in some cases also result from the indicated procedure and are formed by the dehydrohalogenation of the aryloxyalkanes and/or by the dehydrohalogenation of the poly(chlorofluoro)alkane and the subsequent condensation of the aryloxide and the alkene. Efficient rectification is necessary to separate these unsaturated ethers from the parent saturated materials.

The following examples illustrate several ways in which members of this new group of compounds may be prepared, but are not to be construed as limiting the invention thereto.

EXAMPLE 1

Two moles of anhydrous sodium 3-methylphenoxide and a small amount of toluene were dissolved in a liter of anhydrous acetone in a flask fitted with a sealed stirrer, separatory funnel, reflux condenser, and thermometer. The mixture was cooled to 7 degrees centigrade by means of an ice bath and two moles (270 grams) of 1,2-dichloro-1,1-difluoroethane was added with constant agitation over a two-hour period. No appreciable temperature increase occurred during addition. The reaction mixture was warmed to room temperature and finally heated for 12 hours at 40-50 degrees centigrade. During this time the precipitation of salt was noted. Acetone was stripped from the mixture and after the residue was made basic (pH about 9), steam-distillation was used to remove organic reaction products. The organic layers of the distillates were separated, then dried over anhydrous sodium sulphate and rectified. The fraction boiling at 69.8-70.0 degrees centigrade at 4 millimeters of mercury pressure was identified as (3-methylphenoxy)-2-chloro-1,1-difluoroethane.

EXAMPLE 2

Two moles of anhydrous sodium 2-methylphenoxide was dissolved in 800 milliliters of anhydrous acetone in a flask fitted with a sealed-stirrer, separatory funnel, reflux condenser and thermometer. The condenser was connected at its exit end to a Dry-Ice-cooled trap. The reaction mixture was cooled to between five and ten degrees centigrade and two moles (270 grams) of 1,2,-dichloro-1,1-difluoroethane was added with continuous stirring over a period of two hours. The mixture was then refluxed gently for about 17 hours, at the end of which time the reflux condenser was arranged to allow distillation. About 800 milliliters of organic material distilled, and after two moles of dilute sodium hydroxide had been added to the residue, an additional amount of organic matter was steam-distilled. The distillates were separately washed with water and dried over calcium chloride. A considerable amount of 2-chloro-1,1-difluoroethene (0.59 mole) was collected in the Dry-Ice-cooled trap during this experiment. Rectification of combined organic products of the reaction in an efficient column yielded 40 grams of (2-methylphenoxy)-2-chloro-1,1-difluoroethane, boiling at 66.0 degrees centigrade at 4 millimeters of mercury pressure absolute.

EXAMPLE 3

In the same equipment and in a manner analogous to Example 2, two moles of sodium 4-methylphenoxide was condensed with two moles of 1,2-dichloro-1,1-difluoroethane. Forty-one grams (0.42 mole) of 2-chloro-1,1-difluoroethene was collected in the Dry-Ice-cooled trap and rectification yielded 29 grams of (4-methylphenoxy)-2-chloro-1,1-difluoroethane, boiling at 69.6-70.2 degrees centigrade at 4 millimeters of mercury pressure absolute.

EXAMPLE 4

In a manner similar to Example 2, approximately 0.815 mole of potassium 3-trifluoromethylphenoxide was treated with 1,2-dichloro-1,1-difluoroethane (0.816 mole) in 500 milliliters of anhydrous acetone solvent cooled to ice temperature. The reflux condenser was connected in series with a Dry-Ice-cooled trap and, while the mixture was maintained below 8 degrees centigrade, the 1,2-dichloro-1,1-difluoroethane was added drop-wise over a period of one and one-half hours. The reaction mixture was allowed to rise to room temperature over a four-hour period, and thereafter was refluxed for twelve hours. The condenser was then adjusted for distillation from the flask and 500 milliliters of organic liquid distilled from the mixture. One mole of sodium hydroxide was added to the residue and the resulting mixture was steam-distilled. The distillates were separately washed with water and extracted with chloroform. The combined organic products were dried over calcium chloride and distilled to remove volatile constituents. Seventy-nine grams of ethereal products remained, from which was separated (3 - trifluoromethylphenoxy) - 2 - chloro - 1,1 - difluoroethane, boiling at 56.6 to 56.9 degrees centigrade at 4 millimeters of mercury pressure absolute. The Dry-Ice-cooled trap collected 0.28 mole of 2-chloro-1,1-difluoroethene, formed by dehydrochlorination of starting material.

EXAMPLE 5

Eight hundred and ninety-five grams (7.7 moles) of anhydrous sodium phenoxide was produced by mixing equimolar quantities of phenol and sodium hydroxide and removing the resulting water by azeotropic distillation with toluene.

The anhydrous sodium phenate and a small amount of residual toluene were mixed with 1850 milliliters of acetone in a flask fitted with a reflux condenser, sealed stirrer and dropping funnel. The mixture was cooled in an ice bath and 1040 grams (7.7 moles) of 1,2-dichloro-1,1-difluoroethane was added dropwise over a period of two hours. The reaction mixture was then allowed to warm to room temperature, where it was maintained for seventeen hours. The contents of the flask were then refluxed for eight hours. During reflux some dehydrochlorination to 2-chloro-1,1-difluoroethene was observed. Acetone and unreacted ethane derivative were then stripped from the mixture, about 81 grams (0.6 mole) of 1,2-dichloro-1,1-difluoroethane being recovered therefrom. About three moles of solid sodium hydroxide was then added and the reaction mixture was steam-distilled. The sodium hydroxide prevented any free phenol which formed during dehydrochlorination from contaminating the distillate. The organic layer of the resulting distillate was separated, dried and rectified. Two hundred and four grams of phenoxy-2-chloro-1,1-difluoroethane was obtained, boiling at 55.8 degrees centigrade at four millimeters of mercury pressure absolute.

EXAMPLE 6

Anhydrous sodium phenoxide (6.4 moles) was prepared as in Example 5. About one liter of acetone was added to the anhydrous sodium phenate and a small amount of residual toluene in a flask fitted with a sealed stirrer, thermometer, dropping funnel and a reflux condenser connected in series with a Dry-Ice-cooled collector. The flask and its contents were cooled to ten degrees centigrade and 6.4 moles of 1,2,2-trichloro-1,1-difluoroethane was added slowly over a three-hour period with constant stirring. The reaction temperature, which was maintained between 12 and 17 degrees centigrade during addition, was thereafter allowed to come to room temperature. To insure complete reaction, the mixture was further heated to reflux over a four-hour period. No material collected in the cold trap during the reaction. A small amount of concentrated sodium hydroxide solution was then introduced into the flask and the mixture was steam-distilled. The distillate was diluted with water and the organic layer was separated and dried prior to rectification. Acetone and toluene were stripped from the product at atmospheric pressure and the remaining liquid was rectified in a vacuum. Phenoxy-2,2-dichloro-1,1-difluoroethane, boiling at 67.9 degrees centigrade at 4 millimeters of mercury pressure absolute was obtained, the yield and conversion being 83 and 79.2 per cent, respectively, based on the starting ethane derivative.

EXAMPLE 7

In the same manner as in Example 6, (2-methylphenoxy) - 2,2-dichloro - 1,1 - difluoro - ethane was prepared from anhydrous sodium 2-methylphenoxide and 1,2,2-trichloro-1,1-difluoroethane in 300 milliliters of acetone solvent. The time of reaction was 6.5 hours and the maximum reaction temperature was 56 degrees centigrade. Equipment used for the reaction was the same as in Example 6. A 68.5 per cent conversion and yield of the ether, boiling between 77.5 and 78.0 degrees centigrade at four millimeters of mercury pressure absolute, was obtained.

EXAMPLE 8

(4 - Methylphenoxy) - 2,2 - dichloro - 1,1 - difluoroethane was prepared from anhydrous sodium 4-methylphenoxide and 1,2,2-trichloro-1,1-difluoroethane in 200 milliliters of acetone solvent, the time of reaction being 19 hours and the maximum temperature 56 degrees centigrade. Equipment for the reaction was the same as in Example 6. A 57.0 per cent yield and conversion of the ether, boiling between 79.8 and 80.3 degrees centigrade at four millimeters of mercury pressure absolute, was obtained.

EXAMPLE 9

Anhydrous sodium 3-trifluoromethylphenoxide and 1,2,2-trichloro-1,1-difluoroethane were condensed in 200 milliliters of butanone solvent to give a 68 per cent yield and a 56 per cent conversion to (3-trifluoromethylphenoxy)-2,2-dichloro-1,1-difluoroethane (based on the phenoxide consumed). The reaction time was seven hours and the maximum reaction temperature was 79 degrees centigrade. Equipment for the reaction was the same as in Example 6. The (3-trifluoromethylphenoxy) - 2,2 - dichloro - 1,1 - difluoroethane boiled at 64.2 to 64.7 degrees centigrade at four millimeters of mercury pressure absolute.

EXAMPLE 10

Two moles (371 grams) of 2-chloro-1,1,1,3,3,3-hexafluoropropane (containing 18.7 per cent chlorine, 61.0 per cent fluorine, and having a molecular weight of 183, as compared with the theoretical content of 19.0 per cent chlorine, 61.2 per cent fluorine and a theoretical molecular weight of 186.5), 1.07 moles (154 grams) of 1-naphthol, 1.07 moles (101 grams) of phenol, 2.14 moles (88 grams) of sodium hydroxide, and 500 milliliters of acetone were placed in an iron autoclave of one liter capacity fitted into a mechanical rocker. The vessel was heated for about seventeen hours between 160 and 170 degrees centigrade before being allowed to cool. The product was then removed from the autoclave, mixed with water, made basic with aqueous sodium hydroxide solution, and steam-distilled. The lower-layer of the distillate was separated, dried, mixed with a sample (75 grams) of product formed in a like manner by the action of sodium phenoxide on the chlorohexafluoropropane, and rectified in a column of a type developing about 100 theoretical plates at atmospheric pressure. Due to difficulties encountered because of the presence of excess phenol, the material was removed from the column and again steam-distilled from a basic solution before rectification was completed. Several plateaus were found by the rectification, and fractions having a narrow boiling range were taken for analysis. The following compounds were obtained thereby: phenoxy-2-chloro-1,3,3,3-tetrafluoropropene, phenoxy - 2 - chloro - 1,1,3,3,3 - pentafluoropropane, (1 - naphthoxy) - 2 - chloro - 1,1,3,3,3 - pentafluoropropane and (1 - naphthoxy) - 2 - chloro - 1,3,3,3-tetrafluoropropene.

EXAMPLE 11

One and six-hundredths moles (259 grams) of 4 - methoxy - 1,3 - bis(trifluoromethyl)benzene was placed in a standard vertical chlorination tube of 51 millimeters glass tubing about four feet in length. The tube was fitted with a water-cooled glass spiral extending into the liquid, a gas dispersion disc, a thermocouple well, and a reflux condenser. The reaction mixture was kept saturated with chlorine over a period of 65 hours while the temperature was maintained between 20 and 35 degrees centigrade. In 65 hours the solution gained about 104 grams, or about three gram atoms of chlorine per mole of ether. At this point the chlorination was stopped. The aerated material used for an experiment in which 0.87 mole (300 grams) of the 4-trichloromethoxy-1,3-bis(trifluoromethyl)benzene was mixed with 1.4 moles (250 grams) of powdered antimony trifluoride and 0.16 mole (50 grams) of antimony pentachloride in a three-neck flask fitted with a reflux condenser, thermometer, and sealed stirrer. The temperature was raised to 130–140 degrees centigrade for about four hours. The resulting mixture consisted of a dark-colored lower layer of antimony salts and an almost colorless layer of organic material. A little water and 100 grams of sodium hydroxide were added and the mixture then steam-distilled. The lower layer of the distillate was separated and dried over calcium sulfate prior to rectification, which yielded 140 grams of a liquid boiling at 132.2 to 132.8 degrees centigrade (uncorrected) and 10 grams of a higher-boiling material. The large fraction proved to be the desired 4-trifluoromethoxy-1,3-bis(trifluoromethyl)benzene or 2,4-bis(trifluoromethyl) phenoxy - trifluoromethane, (53.3% yield and conversion based on the original methoxy-compound, Found: 0% Cl, 57.9% F, 297 M. W.; theory: 0% Cl, 57.4% F, 298 M. W.). The following physical properties were determined:

B. P., °C.$_{745}$=137.0
M. P.=sets to a glass
$n_D^{20}$=1.3611
$d_4^{20}$=1.5507

This compound (2,4 - bis - (trifluoromethyl) - phenoxytrifluoromethane) may also be prepared according to the general procedure hereinbefore given, e. g., by the reaction of an alkali metal 2,4-bis(trifluoromethyl)phenoxide and chlorotrifluoromethane. The method of this example, however, is the preferred method of producing the compound in its highest degree of purity.

Also included within the scope of our invention are other compounds identified by the general formula

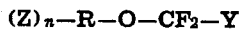

$$(Z)_n-R-O-CF_2-Y$$

wherein R represents a phenyl or naphthyl residue, wherein Z represents $CH_3$ or $CF_3$; $n$ is zero or an integer up to 2; and wherein Y represents hydrogen, chlorine, fluorine, an alkyl radical or a halogen-substituted alkyl radical, said alkyl or halogen-substituted alkyl radicals containing up to 2 carbon atoms, inclusive.

Other polyhaloalkanes which may be reacted with a selected alkali metal phenoxide or naphthoxide include chlorodifluoromethane, dichlorodifluoromethane, 1-chloro-1,1-difluoroethane, 1-chloro - 1,1,2,2,2 - pentafluoroethane, 1,2,2 - trichloro - 1,1,3,3,3-pentafluoropropane, and the like.

Among aryloxides which may be reacted with the above named polyhaloalkanes according to the previously described method may be mentioned sodium 2,4-dimethylphenoxide, potassium 3,5 - bis(trifluoromethyl)phenoxide, dimethylnaphthoxides, (trifluoromethyl)naphthoxides, and the like.

In this manner, by reacting the selected alkali metal aryloxide and the chosen polyhaloalkane, may be produced, for example, 2,4-bis(trifluoromethyl) phenoxy-1,1-difluoromethane, phenoxy-1,1-difluoroethane, naphthoxy - 1,1 - difluoropropane, 2,4-dimethylphenoxy-1-chloro-1,1-difluoromethane, 1-(4-methylnaphthoxy) - 1,1 - difluoroethane, 1 - (4-(trifluoromethyl)naphthoxy)-1,1-difluoro - 2,2,2 - trichloroethane, phenoxy-2,2-dichloro - 1,1,2 - trifluoroethane, 2,4 - bis(trifluoromethyl) phenoxy - 2 - chloro-1,1,3,3-tetrafluoropropane, 1-(4-methylnaphthoxy) - 2,2 - dichloro-1,1,3,3,3-pentafluoropropane, and similar compounds.

A preferred embodiment of the present invention resides in compounds of the above general formula wherein Y is selected from the group consisting of fluorine and halogen-substituted alkyl radicals containing up to 2 carbon atoms, inclusive.

The following table will serve to indicate physical constants of some of the compounds of the present invention:

naphthyl radicals, and trifluoromethyl-substituted phenyl and naphthyl radicals, $n$ is an integer of the group consisting of zero and one,

TABLE

*Certain aryloxy(polychlorofluoro)alkanes*

| Formula | B. P., °C., 740 mm. | M. P., °C. | $D_4^{27}$ | $N_D^{30}$ | Analyses | | | | | |
|---|---|---|---|---|---|---|---|---|---|---|
| | | | | | Calc'd, per cent | | | Found, per cent | | |
| | | | | | Cl | F | M. W. | Cl | F | M. W. |
| $C_6H_5OCF_2CHCl_2$ | 216.0 | −23.5 to −24.0 | 1.3706 | 1.4789 | 31.2 | 16.7 | 227 | 31.2 | 17.4 | 224 |
| 2-$CH_3C_6H_4OCF_2CHCl_2$ | 230.0 | −18.0 to −20.0 | 1.334 | 1.485 | 29.5 | 15.8 | 241 | 29.3 | 15.0 | 240 |
| 3-$CH_3C_6H_4OCF_2CHCl_2$ | 230.5 | Sets to glass | 1.322 | 1.482 | 29.5 | 15.8 | 241 | 29.4 | 14.2 | 247 |
| 4-$CH_3C_6H_4OCF_2CHCl_2$ | 233.5 | −13.0 to −16.0 | 1.320 | 1.481 | 29.5 | 15.8 | 241 | 29.5 | 14.5 | 238 |
| 3-$CF_3C_6H_4OCF_2CHCl_2$ | 211.0 | Sets to glass | 1.485 | 1.437 | 24.5 | 32.2 | 295 | 25.6 | 33.0 | 304 |
| $C_6H_5OCF_2CH_2Cl$ | 196.0 | −50.0 to −52.5 | 1.2704 | 1.4777 | 18.4 | 19.7 | 192.5 | 18.4 | 20.1 | 191 |
| 2-$CH_3C_6H_4OCF_2CH_2Cl$ | 213.5 | −32.0 to −35.0 | 1.2388 | 1.4758 | 17.2 | 18.4 | 206.5 | 17.1 | 18.7 | 206 |
| 3-$CH_3C_6H_4OCF_2CH_2Cl$ | 217.0 | Sets to glass | 1.2325 | 1.4731 | 17.2 | 18.4 | 206.5 | 17.2 | 18.1 | 204 |
| 4-$CH_3C_6H_4OCF_2CH_2Cl$ | 216.5 | Sets to glass | 1.2222 | 1.4732 | 17.2 | 18.4 | 206.5 | 16.9 | 18.9 | 208 |
| 3-$CF_3C_6H_4OCF_2CH_2Cl$ | 197.0 | −41.0 to −43.0 | 1.4177 | 1.4255 | 13.6 | 36.5 | 260.5 | 13.4 | 37.1 | 261 |
| $C_6H_5OCF_2CHClCF_3$ | 188.0 | −32.0 to −35.0 | 1.4112 | 1.4215 | 13.6 | 36.5 | 260.5 | 13.2 | 37.6 | 257 |
| 1-$C_{10}H_7*OCF_2CHClCF_3$ | 278.5 | −10.0 to −12.0 | 1.4220 | 1.5071 | 11.4 | 30.6 | 310.5 | 11.6 | 30.9 | 310 |

*Naphthyl.

Various modifications may be made in the present invention without departing from the spirit or scope thereof, and it is to be understood that we do not limit ourselves except as indicated by the appended claims.

We claim:

1. 1 - Naphthoxy - 2 - chloro - 1,1,3,3,3 - pentafluoropropane.

2. Phenoxy - 2 - chloro - 1,1,3,3,3 - pentafluoropropane.

3. 2,4 - bis - (trifluoromethyl) - phenoxytrifluoromethane.

4. An aryloxytrifluoroalkyl ether having the formula:

$$R-O-(CF_2)_n-(CClZ)_m-CF_3$$

wherein R is a radical of the group consisting of phenyl, naphthyl, methyl-substituted phenyl and naphthyl radicals, and trifluoromethyl-substituted phenyl and naphthyl radicals, $n$ is an integer of the group consisting of zero and one, $m$ in an integer of the group consisting of zero and one, and Z is an atom of the group consisting of hydrogen and chlorine, $n$ being equal to one when $m$ is equal to one.

EARL T. McBEE.
ROBERT O. BOLT.

REFERENCES CITED

The following references are of record in the file of this patent:

UNITED STATES PATENTS

| Number | Name | Date |
|---|---|---|
| 2,409,274 | Hanford | Oct. 15, 1946 |
| 2,425,426 | Joyce | Aug. 12, 1947 |

FOREIGN PATENTS

| Number | Country | Date |
|---|---|---|
| 523,449 | Great Britain | July 15, 1940 |